(12) United States Patent
Kojima et al.

(10) Patent No.: US 10,247,135 B2
(45) Date of Patent: Apr. 2, 2019

(54) SUPPORT STRUCTURE FOR CRANKSHAFT

(71) Applicant: MITSUBISHI JIDOSHA KOGYO KABUSHIKI KAISHA, Tokyo (JP)

(72) Inventors: Mitsutaka Kojima, Okazaki (JP); Shinichi Murata, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 14/847,475

(22) Filed: Sep. 8, 2015

(65) Prior Publication Data

US 2016/0069295 A1 Mar. 10, 2016

(30) Foreign Application Priority Data

Sep. 9, 2014 (JP) .................. 2014-183640

(51) Int. Cl.
*F02F 7/00* (2006.01)
*F01M 1/02* (2006.01)
(Continued)

(52) U.S. Cl.
CPC ............. *F02F 7/0002* (2013.01); *F01M 1/02* (2013.01); *F02B 67/06* (2013.01); *F02F 7/0021* (2013.01); *F02F 7/0043* (2013.01); *F02F 7/0073* (2013.01); *F16C 9/02* (2013.01); *F02F 2007/0075* (2013.01);
(Continued)

(58) Field of Classification Search
CPC ........... F02F 7/0002; F02B 67/06; F16C 9/02; F01M 1/02
See application file for complete search history.

(56) References Cited

U.S. PATENT DOCUMENTS 1,916,522 A * 7/1933 McCuen ................ F01M 11/02
123/41.86
4,911,117 A * 3/1990 Nishimura ................ F16C 9/02
123/195 H
(Continued)

FOREIGN PATENT DOCUMENTS

CN 102877931 A 1/2013
FR 2 992 363 A1 12/2013
(Continued)

OTHER PUBLICATIONS

Extended European Search Report dated Dec. 8, 2015 in corresponding European Application No. 15182004.0.
(Continued)

Primary Examiner — Kevin A Lathers
(74) Attorney, Agent, or Firm — Birch, Stewart, Kolasch & Birch, LLP

(57) ABSTRACT

A support structure for a crankshaft includes a crankshaft that is rotatably supported on a cylinder block of an internal combustion engine and has an end portion protruding from the cylinder block, a sprocket that is attached on the end portion protruding from the cylinder block and is connected to a cam shaft, a pulley that is attached on the end portion on an opposite side from the sprocket with respect to the cylinder block and is connected to an auxiliary apparatus, and an end bearing that rotatably supports the end portion relative to the cylinder block and is provided on the end portion between the sprocket and the pulley.

12 Claims, 5 Drawing Sheets

(51) Int. Cl.
*F02B 67/06* (2006.01)
*F16C 9/02* (2006.01)
*F16C 21/00* (2006.01)

(52) U.S. Cl.
CPC ....... *F02F 2007/0078* (2013.01); *F16C 21/00* (2013.01); *F16C 2360/22* (2013.01)

(56) References Cited

U.S. PATENT DOCUMENTS

| | | |
|---|---|---|
| 5,901,679 A | 5/1999 | Tanaka et al. |
| 2002/0129782 A1 | 9/2002 | Kawamoto et al. |
| 2003/0062211 A1* | 4/2003 | Tsuruda ................... B60K 5/12 180/291 |
| 2011/0073064 A1* | 3/2011 | Mavinahally ............. F01L 1/02 123/195 R |

FOREIGN PATENT DOCUMENTS

| | | |
|---|---|---|
| JP | 10141079 A | 5/1998 |
| JP | 2006-342694 A | 12/2006 |
| JP | 2013-130080 | 7/2013 |
| WO | WO 2014/001665 A1 | 1/2014 |

OTHER PUBLICATIONS

Chinese Office Action dated Jun. 2, 2017 in corresponding Chinese Application No. 201510568037.9.
Office Action dated May 30, 2018 in corresponding JP Application No. 2014-183640.

* cited by examiner

SUPPORT STRUCTURE FOR CRANKSHAFT

CROSS REFERENCE TO RELATED APPLICATION

This application is based on Japanese Patent Application No. 2014-183640 filed on Sep. 9, 2014, the contents of which are incorporated herein by reference.

BACKGROUND

1. Technical Field

The present invention relates to a support structure for a crankshaft rotatably supported on a cylinder block of an internal combustion engine.

2. Related Art

A crankshaft is rotatably supported on a cylinder block of an internal combustion engine (hereinafter, simply referred to as an engine), and the crankshaft is configured so that crank journals thereof are rotatably supported on a case of the cylinder block via sliding bearings (metal bearings).

An end portion of the crankshaft is arranged outside the case, and a sprocket connected to a cam shaft is attached on the end portion. Also, a pulley connected to auxiliary equipment, such as, an alternator, a power steering pump, an air conditioner compressor and the like is attached on the end portion of the crankshaft arranged outside the case.

Thus, a load from the cam shaft is intensively exerted on a region of the sliding bearing of the crank journal, which is located at the end side, through the chain and the sprocket, and also a load from the auxiliary equipment is exerted on the region of the sliding bearing of the crank journal, which is located at the end side, through the belt and the pulley.

As the auxiliary equipment attached to the engine, a starter generator constituted by combining a starter and a generator of the engine is known (see JP-A-2006-342694). The starter generator is an object larger than a general generator and is connected to the crankshaft of the engine via an auxiliary belt, such as a timing belt.

The engine having the starter generator is configured so that at startup, a driving force is inputted from the starter generator to the auxiliary belt and during operation of the engine, a driving force is inputted from the engine (crankshaft) to the auxiliary belt. In the engine having the starter generator, a particular large load is exerted on the auxiliary belt.

Accordingly, a large cantilever load from the auxiliary belt is exerted on the crank journal of the crankshaft, and thus there is a possibility that an oil film formation in the sliding bearing (metal bearing) is not facilitated so that friction loss and wear of the sliding bearing are increased.

Also, if alignment of the pulley around which the auxiliary belt is wound is not exactly performed, there is a possibility that friction is increased and a large load is exerted so that wear of the auxiliary belt is increased.

The present invention has been made keeping in mind the above problems, and an object thereof is to provide a support structure for a crankshaft according, which can reduce a load to be applied to the crankshaft from an auxiliary belt.

SUMMARY OF THE INVENTION (1) According to an aspect of the invention, a support structure for a crankshaft includes a crankshaft that is rotatably supported on a cylinder block of an internal combustion engine and has an end portion protruding from the cylinder block, a sprocket that is attached on the end portion protruding from the cylinder block and is connected to a cam shaft, a pulley that is attached on the end portion on an opposite side from the sprocket with respect to the cylinder block and is connected to an auxiliary apparatus, and an end bearing that rotatably supports the end portion relative to the cylinder block and is provided on the end portion between the sprocket and the pulley.

In the present invention according to (1), because the end bearing for rotatably supporting the end portion of the crankshaft is provided between the sprocket and the pulley, i.e., outside of the sprocket connected to the cam shaft, the crankshaft can be supported on the vicinity of the pulley connected to the auxiliary apparatus.

As a result, a load to be applied to the crankshaft from the auxiliary belt can be reduced.

By the way, a technique in which a sprocket of a cam shaft is pivotally supported on a housing to have a both-end support structure is disclosed in Japanese Patent Application Publication No. 2000-282952. However, the technique disclosed in Japanese Patent Application Publication No. 2000-282952 is a technique of fields related to rotating support of an engine shaft, but is a technique for support the cam shaft and thus relates to a field different from a technique of the present invention for reducing a load to be applied to the crankshaft from the auxiliary belt.

(2) In the support structure for the crankshaft of (1), the end bearing is supplied with a lubricating oil for lubricating the internal combustion engine.

In the present invention according to claim 2, because the ball bearing is lubricated by an internal combustion engine lubricating oil, durability of the ball bearing can be enhanced and also a driving sound of the ball bearing can be alleviated.

(3) The support structure for the crankshaft of (1) or (2) further includes a lubricating oil pump that is driven by rotation of the crankshaft to pump the lubricating oil to a lubricating oil path of the internal combustion engine, and a bearing supply path that supplies the lubricating oil pumped by driving of the lubricating oil pump to the end bearing.

In the present invention according to (3), because the lubricating oil pump for pumping the lubricating oil to the lubricating oil path of the internal combustion engine and the bearing supply path for supplying the lubricating oil to the end bearing are provided, lubrication of the ball bearing can be facilitated.

(4) In the support structure for the crankshaft of any one of (1) to (3), a distance from the ball bearing to a part supporting the pulley in an axial direction of the crankshaft is set to be shorter than a distance from the ball bearing to a part supporting the sprocket in the axial direction.

In the present invention according to claim 4, because the distance from the ball bearing to the part supporting the pulley is set to be shorter, the crankshaft can be exactly supported in a situation where an auxiliary belt load applied to the pulley is higher than a chain load applied to the sprocket.

(5) In the support structure for the crankshaft of any one of (1) to (4), a chain case is attached to the cylinder block to cover the end portion of the crankshaft to which the sprocket is attached, and the end bearing is attached to an inside of the chain case facing the cylinder block.

In the present invention according to claim 5, because the ball bearing for supporting the end portion of the crankshaft is attached on the inside of the chain case, the ball bearing can be attached to the cylinder block by fixing the chain case, to which the end bearing has been attached, to the cylinder block.

(6) In the support structure for the crankshaft of any one of (1) to (5), the end bearing and the lubricating oil pump are arranged to be adjacent to each other.

In the present invention according to claim 6, because the end bearing and the lubricating oil pump are arranged to be adjacent to each other, a compact configuration can be achieved.

DESCRIPTION OF PREFERRED EMBODIMENT

Configurations of main parts of an internal combustion engine (hereinafter, simply referred to as an engine) having a support structure for a crankshaft according to one embodiment of the present invention will be described based on FIGS. 1 and 2.

Figure 1:
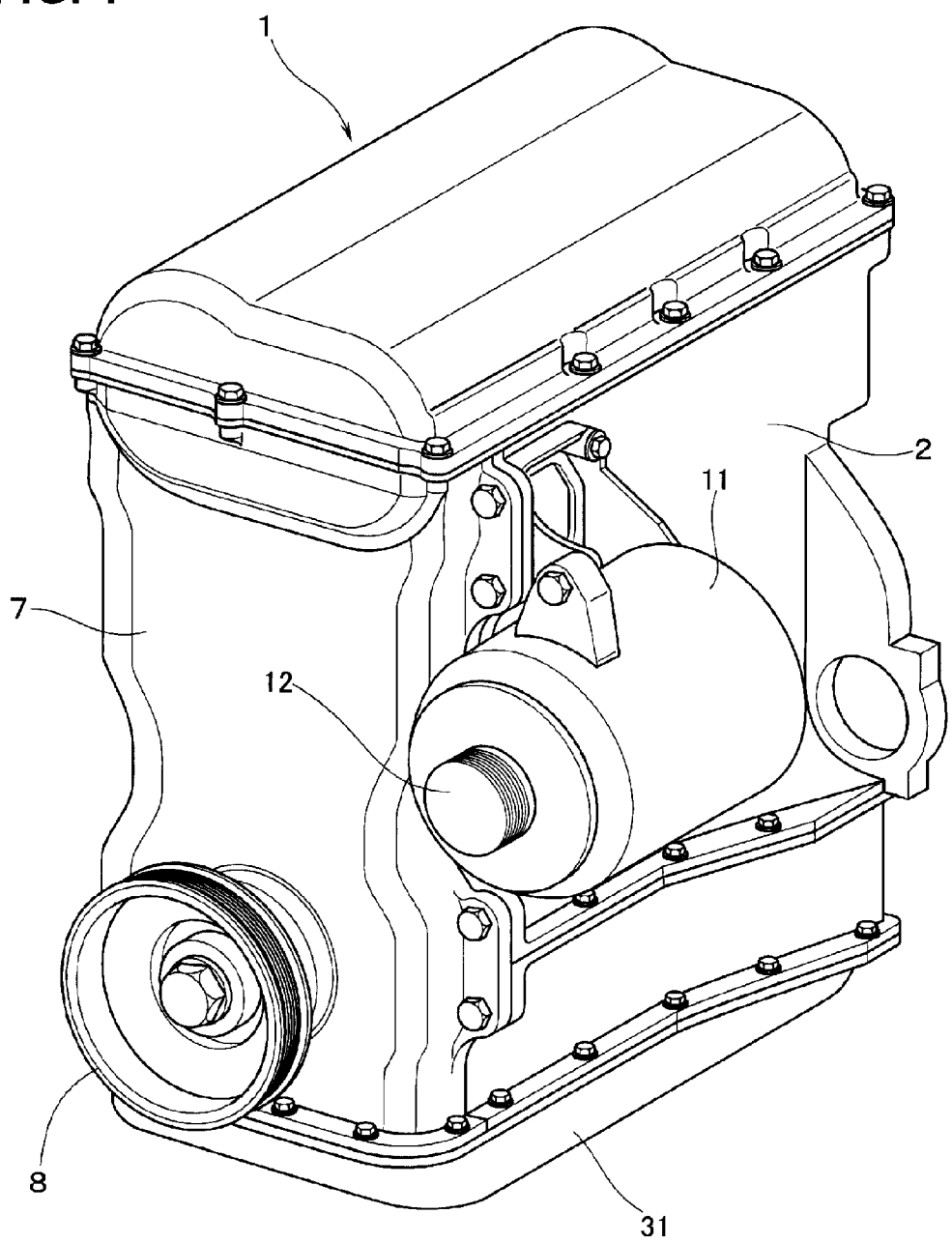
FIG. 1 is a schematic view of an internal combustion engine having a support structure for a crankshaft according to one embodiment of the present invention.
Figure 2:
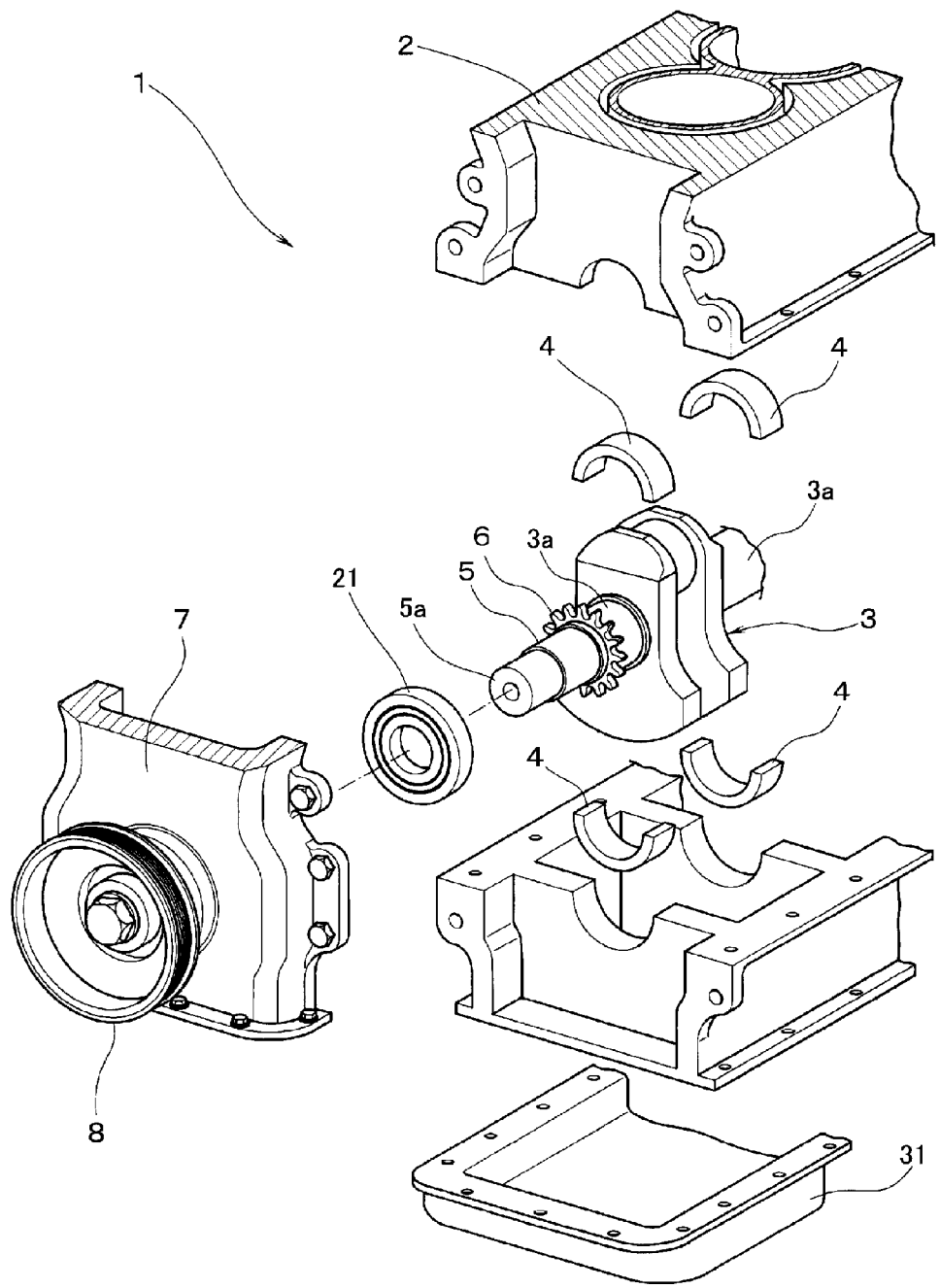
FIG. 2 is an exploded perspective view of an internal combustion engine having a support structure for a crankshaft according to one embodiment of the present invention.

FIG. 1 shows an exterior view showing a general aspect of an engine having a support structure for a crankshaft according to one embodiment of the present invention and FIG. 2 shows an exploded perspective view explaining a support aspect of the crankshaft in the engine having the support structure for the crankshaft according to the embodiment of the present invention.

The crankshaft 3 is rotatably supported on a lower part of a cylinder block 2 of the engine 1. Namely, journals 3a of the crankshaft 3 is rotatably supported on the lower part of the cylinder block 2 via sliding bearings (metal bearings) 4. An end portion 5 of the crankshaft 3 is arranged to protrude from the cylinder block.

A sprocket 6 is attached to the end portion 5 of the crankshaft 3, and the sprocket 6 is connected to a cam shaft via a chain. The sprocket 6 is covered with a chain case 7. A distal end side of the end portion 5 of the crankshaft 3 is arranged to protrude from the chain case 7, and a pulley 8 is attached on a distal end portion 5a of the end portion 5, i.e., the distal end portion 5a located on an opposite side from the sprocket 6 with respect to the cylinder block 2.

Meanwhile, as an auxiliary apparatus, a starter generator 11, which is a combination of a starter and a generator for the engine 1, is held on a lateral side of the cylinder block 2, and auxiliary apparatuses, such as a power steering pump and an air compressor, are also held thereon (not shown). An auxiliary belt, not shown, is wound around an auxiliary pulley 12 of the starter generator 11 and the pulley 8 attached on the distal end portion 5a of the end portion 5 of the crankshaft 3, and the pulley 8 is connected to the starter generator 11.

The engine 1 having the starter generator 11 is configured so that at startup, a driving force is inputted from the starter generator 11 to the auxiliary belt and during operation of the engine 1, a driving force is inputted from the engine 1 (crankshaft 3) to the auxiliary belt.

The detailed aspect of the support structure for the crankshaft according to one embodiment of the present invention will be described based on FIGS. 3 and 4.

Figure 3:
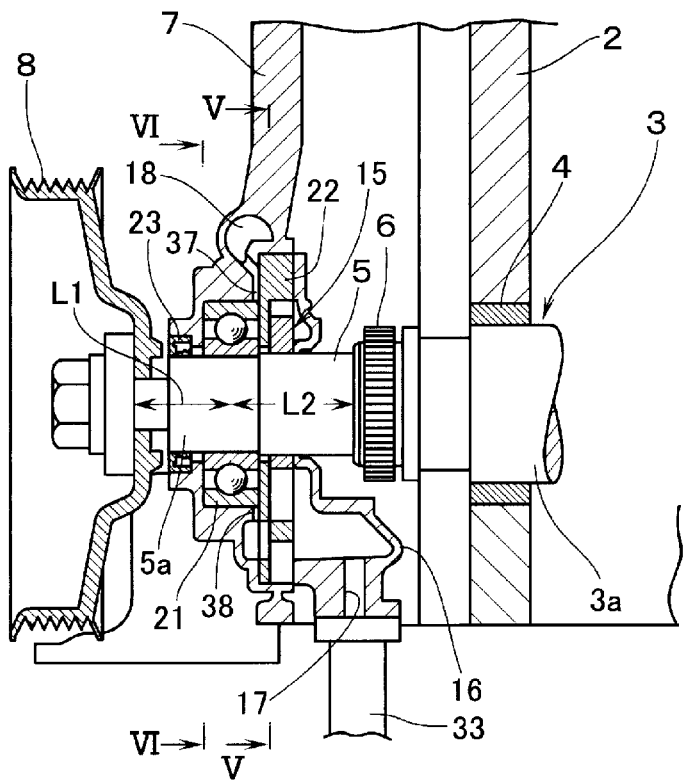
FIG. 3 is a sectional view of a main part of a support portion of the crankshaft.
Figure 4:
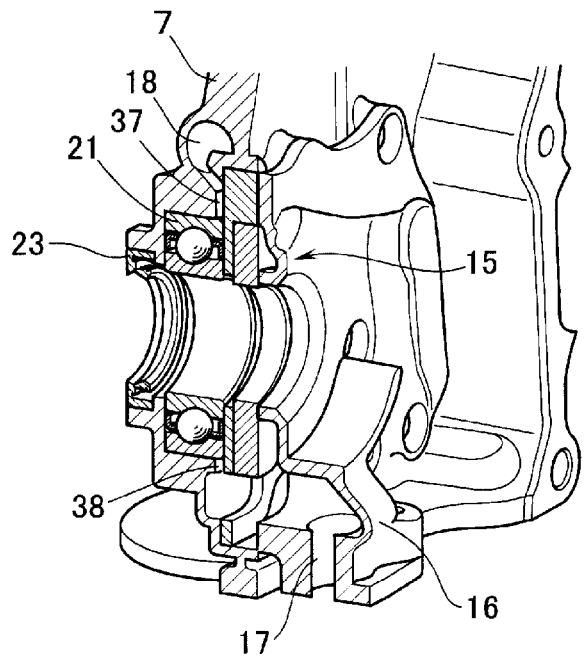
FIG. 4 is a partially broken perspective view of the main part of the support portion of the crankshaft.

FIG. 3 shows a sectional aspect of a main part showing a support portion for the crankshaft and FIG. 4 shows a partially broken perspective aspect of the main part of the support portion of the crankshaft.

A lubricating oil pump 15 is provided on the end portion 5 of the crankshaft inside the chain case 7. The lubricating oil pump 15 is arranged outside of the sprocket 6 (i.e., the side opposite the cylinder block 2) and is covered with a pump cover 16. The lubricant pump 15, which is for example a trochoid pump, is a pump in which an inner rotor and an outer rotor thereof are attached on the end portion 5 of the crankshaft 3 and a volume therein is changed by rotation of the crankshaft 3 (rotation of rotors) to suck and discharge a lubricating oil.

The lubricating oil pump 15 (an inner lower part of the pump cover 16) is provided with a suction port 17 connected to an oil pan, and the chain case 7 is provided with an oil path 18 for guiding the lubricating oil discharged from the lubricant pump 15. The lubricating oil discharged from the lubricating oil pump 15 is guided to a main gallery of the engine 1 through the oil path 18.

A ball bearing 21 as an end bearing is provided at the end portion 5 of the crankshaft 3 inside the chain case 7. The ball bearing 21 is arranged outside of the lubricating oil pump 15 (i.e., the side opposite the cylinder block 2) and thus the end portion 5 of the crankshaft 3 is rotatably arranged relative to the chain case 7 (relative to the cylinder block) by the ball bearing 21. The ball bearing 21 is partitioned off the lubricating oil pump 15 by a bearing cover 22.

An outer ring of the ball bearing 21 is press-fitted into the inside of the chain case 7 and an inner ring of the ball bearing 21 is fitted on the end portion 5 of the crankshaft 3. Because the ball bearing 21 is attached on the inside of the chain case 7, the ball bearing 21 can be attached to the cylinder block 2 by fixing the chain case 7 to the cylinder block 2.

A reference numeral 23 in the drawings designates an oil seal for sealing the end portion 5 of the crankshaft 3.

According to the above configurations, because the end portion 5 of the crankshaft 3 is rotatably supported relative to the chain case 7 (relative to the cylinder block) by the ball bearing 21, the end portion 5 of the crankshaft 3 can be rotatably supported between the sprocket 6 and the pulley 8, i.e., outside of the sprocket 6 connected to the cam shaft.

Accordingly, the crankshaft 3 can be supported on the vicinity of the pulley 8 connected to the starter generator 11 (see FIG. 1), and thus a large load to be applied to the crankshaft 3 from the auxiliary belt of the starter generator 11 (see FIG. 1) can be reduced.

A distance L1 from the ball bearing 21 to a part supporting the pulley 8 in the end portion 5 (distal end portion 5a) of the crankshaft 3 is set to be shorter than a distance L2 from the ball bearing 21 to a part supporting the sprocket 6. Namely, the ball bearing 21 is arranged on the end portion 5 (distal end portion 5a) of the crankshaft 3 to be close to the pulley 8.

Because the distance L1 from the ball bearing 21 to the part supporting the pulley 8 is set to be shorter, the crankshaft 3 can be exactly supported in a situation where an auxiliary belt load applied to the pulley 8 is higher than a chain load applied to the sprocket 6.

The lubricating oil pumped by driving of the lubricating oil pump 15 is supplied to the ball bearing 21. Because the ball bearing 21 is lubricated by such an engine oil, durability of the ball bearing 21 can be enhanced and also a driving sound generated from the ball bearing 21 can be alleviated.

A lubricating oil path will be described in detail based on FIGS. 5 and 6.

Figure 5:
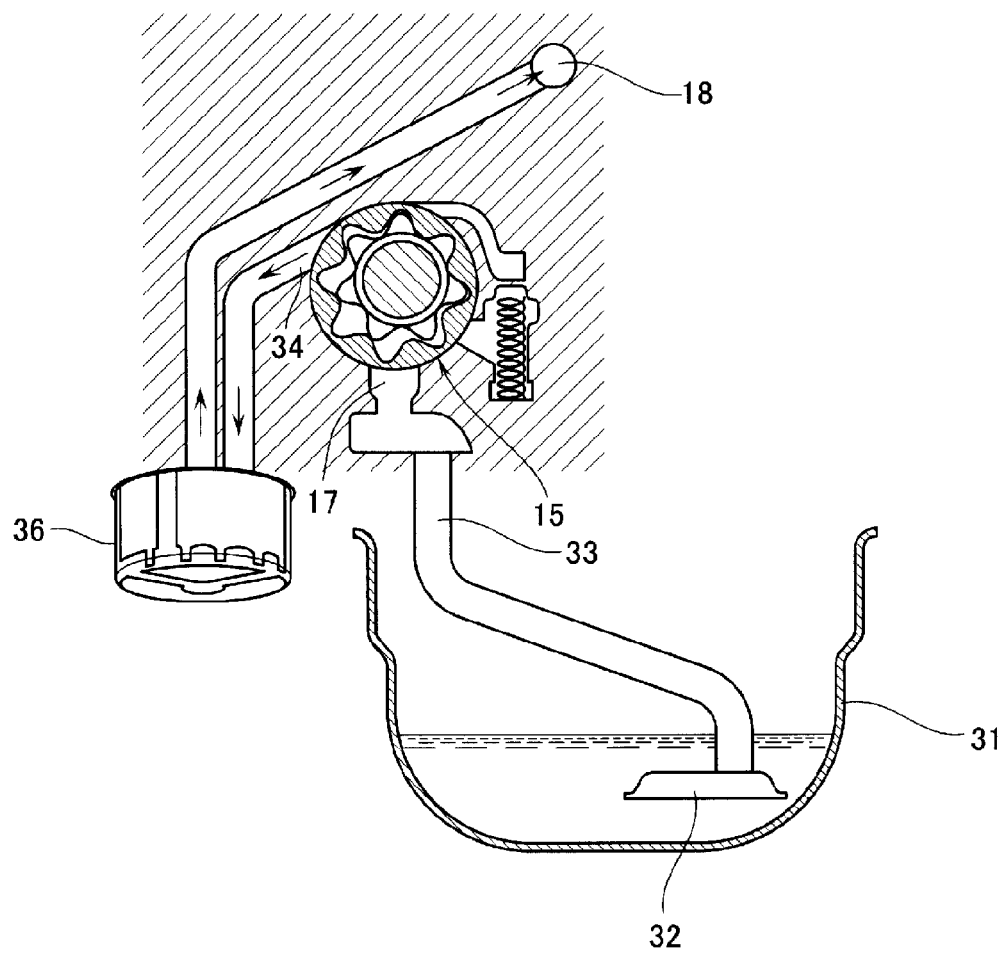
FIG. 5 is a conceptual view of a region of an oil pump explaining a lubricating oil path.
Figure 6:
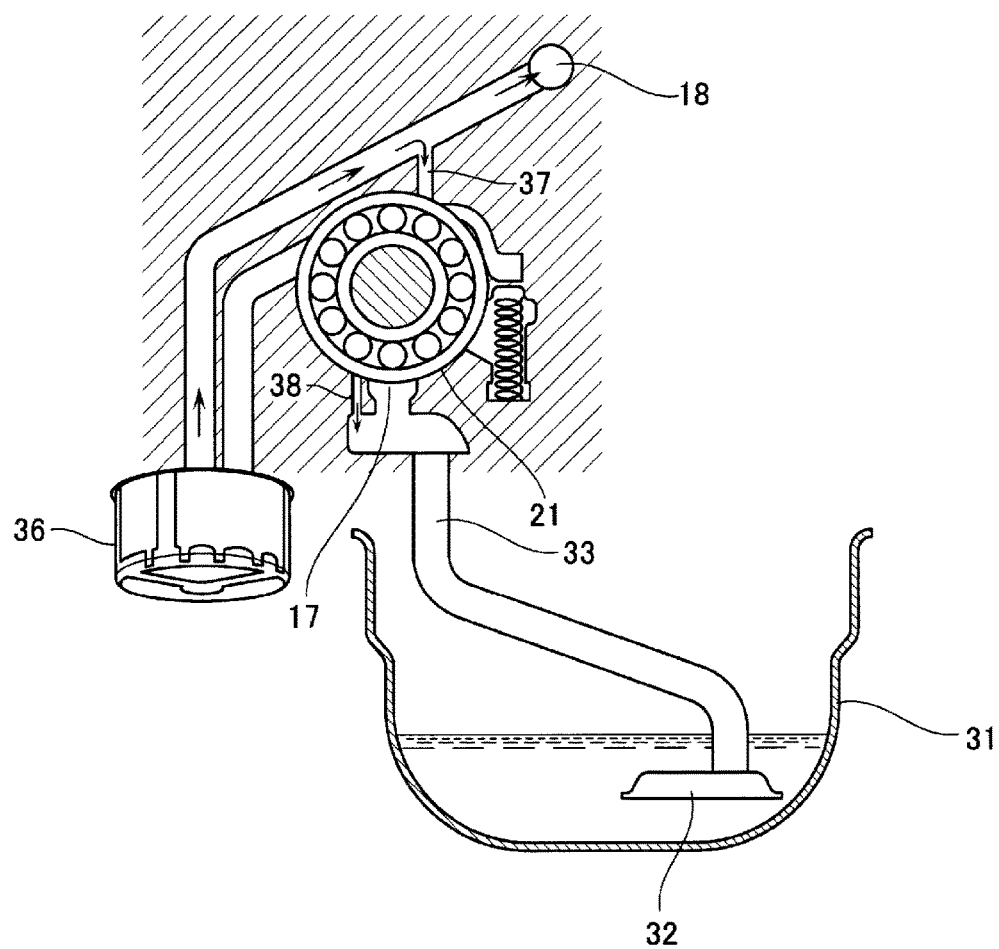
FIG. 6 is a conceptual view of a region of an end bearing explaining a lubricating oil path.

FIG. 5 shows a concept (concept as viewed in a V-V arrow direction in FIG. 3) of a region of the lubricating oil pump 15 explaining the lubricating oil path, and FIG. 6 shows a concept (concept as viewed in a VI-VI arrow direction in FIG. 3) of a region of the ball bearing 21 explaining the lubricating oil path.

As shown in FIG. 5, a suction pipe 33 for guiding the lubricating oil pooled in an oil pan 31 through a strainer 32 is connected to the suction port 17 of the lubricating oil pump 15. A discharge port 34 of the lubricating oil pump 15 is connected to the oil path 18 via an oil filter 36.

As shown in FIG. 6, a lubricating oil passage 37 as a bearing supplying path is provided to be branched from the oil path 18 located above the ball bearing 21. Also, in the pump cover 16 (see FIGS. 3 and 4) located above the ball bearing 21, a return passage 38 is provided to be connected to a flow path located toward the suction port 17.

By driving the lubricating oil pump 15, the lubricating oil is sucked from the suction pipe 33 and then discharged from the discharge port 34, and also the lubricating oil is pumped to the main gallery through the oil filter 36 and the oil path 18, so that the lubricating oil is directed to desired regions of the engine 1. In addition, the lubricating oil is supplied to the ball bearing 21 through the lubricating oil passage 37 and then the lubricating oil is returned to the pumping path of the lubricating oil through the return passage 38.

Accordingly, because the lubricating oil pump 15 provided to be adjacent to the ball bearing 21 is provided with the lubricating oil passage 37 and the return passage 48, lubrication of the ball bearing 21 can be facilitated by driving of the lubricating oil pump 15. Also, by providing the lubricating oil pump 15 to be adjacent to the ball bearing 21, a compact configuration can be achieved.

Because the support structure of the crankshaft as described is configured so that the end portion 5 of the crankshaft 3 is rotatably supported by the ball bearing 21, the end portion 5 of the crankshaft 3 can be rotatably supported outside of the sprocket 6 connected to the cam shaft and thus between the sprocket 6 and the pulley 8, and also the crankshaft 3 can be supported on the vicinity of the pulley 8 connected to the starter generator 11.

Therefore, a large load to be applied to the crankshaft 3 from the auxiliary belt of the starter generator 11 can be reduced.

Accordingly, a large cantilever load from the auxiliary belt is not exerted on the journal 3a of the crankshaft 3 and thus oil film formation in the sliding bearing adapted to support the journal 3a is not deteriorated. Thus, an increased friction loss and an increased wear of the sliding bearing are not occurred. In particular, a sliding friction loss of the journal 3a at startup, at which the lubricating oil is not sufficiently supplied thereto, can be reduced, so that the number of rotations at startup can be smoothly increased and also a starting fuel can be reduced.

Meanwhile, the cantilever load includes not only a large load from the auxiliary belt of the starter generator 11 but also cantilever loads due to unbalance in rotation of various auxiliary apparatus or the pulley 8 caused by driving the auxiliary belt.

Although the example in which the ball bearing 21 is applied as the end bearing is illustrated in the foregoing embodiment, the end bearing is not limited to the ball bearing 21, and thus may employ other bearings, such as a needle bearing and a metal bearing.

Although the example in which the ball bearing 21 is attached to the inside of the chain case 7 is described, the ball bearing 21 may be configured to be attached to the outside of the chain case 7 and thus to be covered with an outer case or the like, which also serves as a seal member.

When the ball bearing 21 is attached to the outside of the chain case 7, replacement or maintenance of the ball bearing 21 can be performed without removing the chain case 7 from the cylinder block 2.

The present invention can be used in industrial fields related to a support structure for a crankshaft rotatably supported on a cylinder block of an internal combustion engine.

What is claimed is:

1. An engine, comprising:
a cylinder block of an internal combustion engine;
a crankshaft that is rotatably supported on the cylinder block and has an end portion protruding from the cylinder block;
a sprocket that is attached on the end portion protruding from the cylinder block and is connected to a cam shaft;
a pulley that is attached on the end portion on an opposite side from the sprocket with respect to the cylinder block and is connectable to an auxiliary apparatus;
an end bearing that rotatably supports the end portion relative to the cylinder block and is provided on the end portion between the sprocket and the pulley;
a chain case that is attached to the cylinder block to cover the end portion of the crankshaft to which the sprocket is attached; and
an oil seal that is disposed at a pulley side of the chain case,
wherein the end bearing is directly attached to the chain case at a cylinder block side of the chain case,
wherein the pulley side of the chain case is an outer side of the chain case and the cylinder block side of the chain case is an inner side of the chain case, and
wherein the end bearing is a ball bearing, and an outer ring of the ball bearing is directly attached to the chain case, and an inner ring of the ball bearing is in direct contact with the crank shaft.

2. The engine according to claim 1, further comprising:
a lubricating oil pump that is driven by rotation of the crankshaft to pump lubricating oil to a lubricating oil path of the internal combustion engine,
wherein the end bearing is supplied with the lubricating oil from the lubricating oil pump, and
wherein the lubricating oil pump is disposed at the inside of the chain case and at a cylinder block side of the end bearing.

3. The engine according to claim 2, further comprising:
a lubricating oil pump that is driven by rotation of the crankshaft to pump the lubricating oil to a lubricating oil path of the internal combustion engine; and
a bearing supply path that supplies the lubricating oil pumped by driving of the lubricating oil pump to the end bearing.

4. The engine according to claim 3, wherein a distance from the end bearing to a part supporting the pulley in an axial direction of the crankshaft is set to be shorter than a distance from the end bearing to a part supporting the sprocket in the axial direction.

5. The engine according to claim 4, wherein the end bearing and the lubricating oil pump are arranged to be adjacent to each other.

6. The engine according to claim 2, wherein a distance from the end bearing to a part supporting the pulley in an axial direction of the crankshaft is set to be shorter than a distance from the end bearing to a part supporting the sprocket in the axial direction.

7. The engine according to claim 2, wherein the oil seal that seals the end portion of the crankshaft, wherein the oil seal, the end bearing, and the lubricating oil pump are arranged at the inside of the chain case in the order of the oil seal, the end bearing, and the lubricating pump.

8. The engine according to claim 1, further comprising:

a lubricating oil pump that is driven by rotation of the crankshaft to pump the lubricating oil to a lubricating oil path of the internal combustion engine; and a bearing supply path that supplies the lubricating oil pumped by driving of the lubricating oil pump to the end bearing.

9. The engine according to claim 8, wherein a distance from the end bearing to a part supporting the pulley in an axial direction of the crankshaft is set to be shorter than a distance from the end bearing to a part supporting the sprocket in the axial direction.

10. The engine according to claim 1, wherein a distance from the end bearing to a part supporting the pulley in an axial direction of the crankshaft is set to be shorter than a distance from the end bearing to a part supporting the sprocket in the axial direction.

11. The engine according to claim 1, wherein the end bearing and the lubricating oil pump are arranged to be adjacent to each other.

12. The engine according to claim 1, wherein the outer ring of the ball bearing is press-fitted into the chain case and the inner ring of the ball bearing is fitted on the crank shaft.

* * * * *